UNITED STATES PATENT OFFICE.

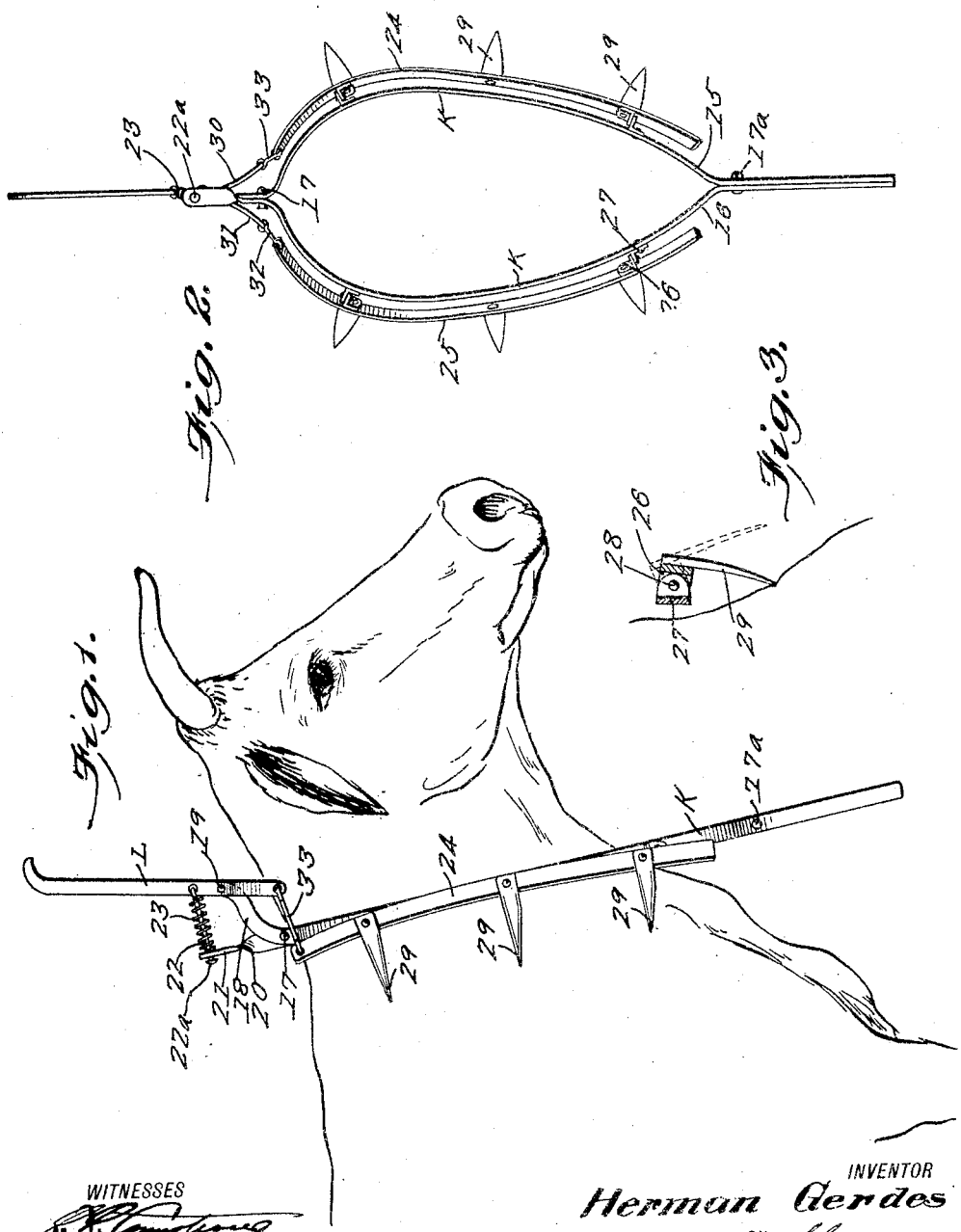

HERMAN GERDES, OF BENKELMAN, NEBRASKA.

ANIMAL-POKE.

1,365,394.　　　　　Specification of Letters Patent.　　Patented Jan. 11, 1921.

Application filed September 5, 1919, Serial No. 321,774. Renewed April 28, 1920. Serial No. 377,399.

*To all whom it may concern:*

Be it known that I, HERMAN GERDES, a citizen of the United States, and a resident of Benkelman, in the county of Dundy and State of Nebraska, have invented certain new and useful Improvements in Animal-Pokes, of which the following is a specification.

My invention relates to animal pokes, and an object of the invention is the provision of a poke of simple and efficient construction, which is formed with spurs mounted to automatically engage the neck of an animal when he attempts to force his way through a fence.

I will describe one form of poke embodying my invention and will then point out the novel features thereof in a claim.

In the accompanying drawings:

Figure 1 is a view, showing in side elevation one form of poke embodying my invention and in applied position upon an animal;

Fig. 2 is a view, showing in rear elevation the poke shown in Fig. 1; and

Fig. 3 is a transverse sectional view, taken through one of the connections for the spur supporting bars.

Similar reference characters refer to similar parts in each of the several views.

Referring specifically to the drawings, K designates a yoke of substantially oval formation to receive and loosely embrace the neck of an animal. This yoke K comprises two flat strips of metal 15 and 16, which are secured adjacent the ends, as at 17 and 17ª. The portions of the strips between the secured points 17 and 17ª are bent outwardly in the form of an arc, as shown in Fig. 2, while those portions of the strips below the point 17ª lie contiguous to each other, as shown. The portion of the strip 15 above the point 17 is bent forwardly and upwardly to provide an extension 18, upon which is fulcrumed, as at 19, a lever L. The portion of the strip 16 above point 17 is twisted, as as 20, to provide an extension 21 for slidably receiving a rod 22. One end of the rod 22 is secured to the lever L above the fulcrum point 19, while the opposite end thereof is provided with a head 22ª for preventing displacement of the rod from the extension. Surrounding the rod 22 is a coiled expansible spring 23, which serves to urge the lever L forwardly to the position shown in Fig. 1.

Arranged upon the curved portions of the strips 15 and 16 are a pair of similarly curved bars 24 and 25, which are pivotally mounted for swinging movement in a horizontal plane by means of L-bars 26 and 27 pivotally connected to each other, as at 28 (Fig. 3) and fixed to the bars 24 and 25 and to the strips 15 and 16, respectively. Fixed at regular spaced intervals to the bars 24 and 25 are spurs 29, which extend rearwardly of the yoke K and are curved inwardly to engage the neck of the animal.

As shown in Figs. 1 and 2, the lower end of the lever L is bifurcated to provide arms 30 and 31, which are operatively connected at their lower ends to the upper ends of the bars 24 and 25, respectively, by means of links 32 and 33.

From this arrangement it will be seen that with the poke in applied position upon the animal, as shown in Fig. 1, and the lever L in the urged position, the bars 24 and 25 will assume a position in which the spurs 29 do not engage the neck of the animal. However, when the upper end of the lever L is moved rearwardly, the bars 24 and 25 are swung rearwardly about the pivots 28 as a center, thus causing the spurs 29 to move inwardly and engage the neck of the animal. The two extreme positions of the spurs 29 are shown in Fig. 3. It will be understood that because of the location of the lever L it is actuated to cause the spurs 29 to engage the neck of the animal whenever the animal attempts to force its way through a fence, and in this active position of the lever the spring 23 is compressed so that as soon as the lever is relieved of the rearward pressure the spring expands and returns the lever to its normal position. During this movement, the bars 24 and 25 are also returned to normal position thereby moving the spurs 29 out of contact with the neck of the animal.

Although I have herein shown and described only one form of poke embodying my invention, it is to be understood that various changes and modifications may be made herein without departing from the spirit of the invention and the spirit and scope of the appended claim.

Having thus described my invention, I claim:

An animal poke comprising a yoke consisting of two strips of rigid material secured adjacent their opposite ends and having that portion between the secured points bent outwardly in the form of an arc, a laterally disposed extension formed on the upper end of the yoke, a lever fulcrumed on said extension, a rod slidably associated with the upper end of the yoke and connected to said lever, a spring surrounding said rod and interposed between said yoke and lever for urging the lever to a predetermined position, bars pivotally secured to said yoke and curved to conform to the contour of the curved portions of said yoke, spurs secured at intervals to said bars, arms formed on the lower end of said lever, and links operatively connected with said bars and arms.

HERMAN GERDES.